Nov. 7, 1961 W. R. DICKIE 3,007,364
SLEEVE AND EXPANDER NUT INSERT WITH INTERLOCKING
MEANS BETWEEN NUT AND SLEEVE
Filed Nov. 25, 1957
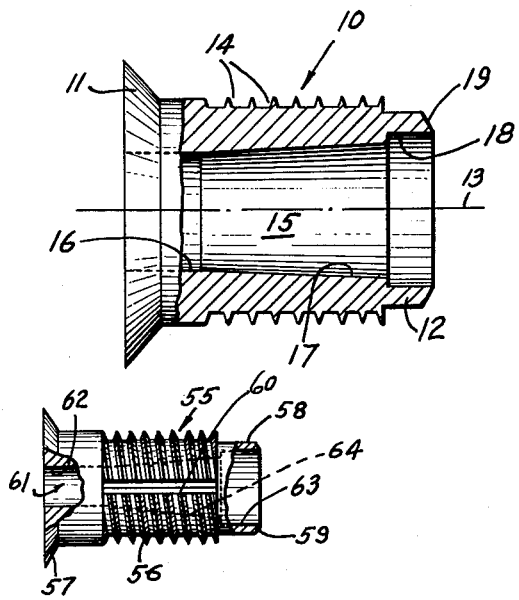
FIG. 1.
FIG. 2.
FIG. 6.
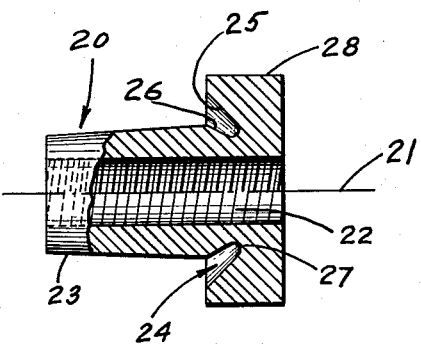
FIG. 3.
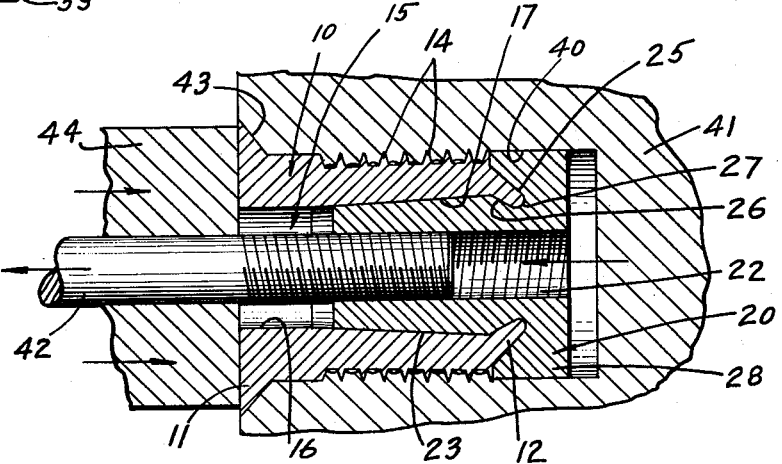
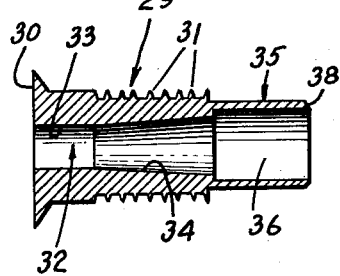
FIG. 4.
FIG. 5.
INVENTOR.
WILLIAM R. DICKIE
BY D. Gordon Angus
ATTORNEY United States Patent Office 3,007,364
Patented Nov. 7, 1961

3,007,364
SLEEVE AND EXPANDER NUT INSERT WITH INTERLOCKING MEANS BETWEEN NUT AND SLEEVE
William R. Dickie, Manhattan Beach, Calif., assignor to Hi-Shear Rivet Tool Company, Torrance, Calif., a corporation of California
Filed Nov. 25, 1957, Ser. No. 698,544
2 Claims. (Cl. 85—2.4)

This invention relates to an insert adapted to be engaged in an opening in an object, such as a soft metal plate, where the insert thereafter serves as a means for attachment to the object of bolts or the like.

An objective of this invention is to provide an insert of the above type which can be inserted in a hole in the object and which does not necessarily require access to the back of the object in order to be installed. A further objective is to provide an insert which can be installed by operations, all of which can be performed on a single side of the object.

An insert according to this invention comprises a two-piece structure that includes a sleeve and a nut. The sleeve is a generally tubular structure with a central bore for passing a mandrel therethrough. This bore is provided with a tapered section. The nut has an outer tapered surface which matches the tapered section of the sleeve, and also has an internal threaded bore for receiving the mandrel. For installation, the mandrel is passed through the bore in the sleeve and the nut is threaded onto the end thereof. The assembled insert is then placed in the opening where it is to be installed. The nut is then pulled in opposition to the sleeve, thereby drawing the tapered surface of the nut into the tapered section of the sleeve. This movement of the nut expands the sleeve so that the sleeve makes a tight fit with the wall of the opening. The insert is now a permanent part of the object. Preferably, although not necessarily, the sleeve is provided with circumferential grooves, the crests between the grooves biting into the wall of the opening.

According to a preferred but optional feature of this invention, the sleeve is provided with a tubular lip at the end adjacent the larger diameter of the tapered section. The nut is provided with a frusto-conical locking groove that faces toward said lip so that, when the nut is drawn into the sleeve, the lip is deflected into the groove, thereby locking the nut to the sleeve and holding the nut against being pushed away from the sleeve.

According to still another preferred but optional feature of the invention, the sleeve may be provided with an external thread and one or more external axial striations which interrupt the thread. When the sleeve is expanded, the thread bites into the object and wall material fills the striations. The axial striations hold the sleeve against turning out. However, if desired, the sleeve can be turned so as to strip out the material in the axial striations, and then the device can be easily removed by unthreading it from the object.

The above and other features of this invention will be fully understood from the following detailed description and the accompanying drawings, of which:

FIG. 1 is a cross-section of a sleeve,
FIG. 2 is a cross-section of a nut,
FIG. 3 is an elevation, partly in cut-away cross-section, showing an insert according to the invention made up of the sleeve and nut of FIGS. 1 and 2, respectively, installed in an opening in an object;
FIG. 4 is a cross-section of an optional form of sleeve;
FIG. 5 is a cross-section of an installed insert comprising the sleeve of FIG. 4 and a modified nut; and
FIG. 6 is an elevation of still another optional form of sleeve.

The presently preferred embodiment of a sleeve 10 for the insert is shown in FIG. 1. This sleeve is generally in the form of a circular cylinder. It has a head 11 at one end and a tubular lip 12 at the other end. The sleeve is symmetrical around its central axis 13. Between the lip and the head there is provided, on the outer surface of the sleeve, a plurality of serrations 14. These serrations may conveniently be peripheral grooves, with crests having voids between them, although they may also be cross-hatched, knurling, or threads, if desired. The purpose of the serrations is to form an irregular surface to bite into the wall of the hole in which the sleeve is installed.

Passing through the sleeve there is an axial bore 15 which has a cylindrical section 16 at the headed end, a frusto-conical tapered section 17 with its larger diameter facing the end of the sleeve away from the head, and a counter-bore 18 which reduces the thickness of the sleeve to render the cross-sectional area of the lip somewhat smaller than the cross-section area of the rest of the sleeve, so that the lip may be more easily bent. A frusto-conical guide section 19, on the end of the lip, has an included conical angle of about 120°.

In FIG. 2 there is shown the presently preferred embodiment of nut 20 for use with the sleeve 10 shown in FIG. 1. The nut has a central axis 21 and a threaded axial bore 22. The exterior of the nut has a tapered frusto-conical surface 23 whose included conical angle is substantially equal to the conical angle of tapered section 17 in the sleeve. These conical angles are preferably, but not necessarily equal to or less than the value of the cone of friction, of the material, which, in a steel insert, would be approximately 3° included conical angle. These angles can also be greater than the value of the cone of friction.

Tapered surface 23 terminates at a locking groove 24, which has two frusto-conical faces, a deflector face 25, and a lock face 26. These two faces are connected by a radius 27. The included conical angle of the deflector face is preferably somewhat smaller than the angle of the guide section 19, for example, 110°. The nut terminates in a head 28. The diameter of the head is preferably no larger than the diameter of the serrated part of the sleeve so that the entire assembly can be slipped into a hole and installed with a minimum sleeve expansion.

An optional type of sleeve, which may be used with the nut of FIG. 2, is illustrated in FIG. 4. This sleeve 29 has a head 30, a plurality of serrations 31, and an axial bore 32, which includes a cylindrical section 33 and a tapered section 34, as in the sleeve of FIG. 1. A lip 35 is formed by a counterbore 36. The lip has a guide section 38, the same as the lip on guide section on the sleeve of FIG. 1. The lip is relatively more elongated than the lip on the sleeve of FIG. 1 for reasons which will become apparent below.

In FIG. 5, there is shown an alternative embodiment of a nut 50 which is provided with a tapered frusto-conical surface 51, a locking groove 52 and a head 53, the same as in the nut 20 shown in FIG. 2. This nut differs from that of FIG. 2 in that its threaded bore 54 extends only part way into the nut. Because the bore goes only part way into the nut, the blind end of the nut is left closed and is suitable for use in fluid-sealing applications such as shown in FIG. 5.

In FIG. 6, still another optional embodiment of a sleeve 55 is shown, this sleeve having an exterior helical thread 56 on its shank with a head 57 at one end and a lip 58 having a guide section 59 at the other end. The helical thread has the customary crests above the root, and voids between the crests. One or more axially-oriented striations 60 (sometimes herein called as "groove") interrupts the threads. This striation preferably, although not necessarily extends for the entire length of the threaded section, and parallel to the central axis of the sleeve. A bore 61 passes through the sleeve, having a cylindrical section 62 at the headed end, a counterbore 63 at the lip end, and a tapered section 64 in between.

In FIG. 3, an insert made up of the sleeve of FIG. 1 and the nut of FIG. 2 is shown inserted in a blind hole 40 in an object 41. This object may be, for example a plate of 75 St aluminum which cannot itself provide threads which are strong enough to hold bolts or the like, which are to be placed under any appreciable forces. Therefore, a steel insert of this type is pressed into said hole, after which the bolt or other device may be threaded directly into the insert itself, which is made of a material which can support bolts or the like. It will be noted that the hole does not have to pierce the object 41, but instead, merely need be deep enough to provide a sink for the reception of the insert. In order to install this insert, a mandrel 42, which is merely a threaded bolt of very high strength steel, is passed through the bore 15 of the sleeve and threaded into the bore 22 of the nut 20. Then the assembly is inserted into the hole in the object to the desired depth. The depth of insertion may be limited by machining a chamfer 43 at the open end of the hole against which the head 11 of the sleeve will bear. Then an anvil 44 of a pulling tool is pressed against the head and the mandrel is drawn in opposition to the anvil. This pulls the nut into the sleeve.

One effect of the relative movement of the nut and sleeve is for the tapered surface 23 to expand the tapered section of the sleeve by virtue of a wedge action. This causes the sleeve to swell and the serrations to dig into the wall of the object in which the insert is held. This, in itself, will create an adequate retentive action to hold the sleeve in place.

In order to provide threads to which bolts can be attached, it is desired to keep the nut tightly engaged to to the sleeve so that the nut cannot be loosened. The lip and locking groove are provided for this purpose. As the nut moves into the sleeve, the lip 12 enters the locking groove where the guide section 19 reacts with the deflector face 25 to deflect the lip into the groove so as to fill the same. Making the angle of deflector face 25 smaller than the angle of guide section 19 results in a better flow of the lip into groove 24 than if the guide section has an equal or lesser value.

When the nut is tightly pulled, it will be seen from FIG. 3 that the lip substantially fills the groove. The lip then bears against the lock face 26 to prevent the nut from being backed out of the insert. The removal of the nut thereafter can be accomplished only by bending the lip, which requires a considerable force which is of greater magnitude than will ordinarily be exerted by a bolt or the like which is threaded into the nut.

After the setting process is completed, the mandrel is unscrewed from the nut and the insert is left behind in the hole, the nut providing a threaded bore for the reception of a bolt or other threaded object, and the sleeve bearing firmly against the wall of the hole, the serrations biting into the said wall.

The installation of the device of the sleeve of FIG. 4 is the same as just described, with the addition of an extra retentive feature by virtue of the elongation of the lip 35 as compared with lip 12 of FIG. 1. As can be seen in FIG. 5, wherein the insert is shown as already installed, axial movement of the nut has caused the sleeve to swell, and has moved the lip into the locking groove. It has also collapsed the lip so that it forms a bulge or bulb 39 on the back side of the workpiece. This is particularly advantageous when the insert is used in a place where it can pass all the way through the material, because then the insert can also be used as a rivet to join two workpieces such as plates 45 and 46 together, the bulb 39 forming a head for the purpose.

By using a nut 50 which has its blind end closed, the fastener comprising sleeve 29 and nut 50 is made fluid-tight. As can be seen from FIG. 5, there is no open passageway in the insert through which fluid can flow. It will be understood that nut 50 could also be used with the sleeves of FIGS. 1 or 6.

The sleeve 55 shown in FIG. 6 can be set with the nut of FIGS. 2 or 5 to create the insert assembly shown in either FIG. 3 or 5 depending upon the relative length of the lip 58. When sleeve 55 is set, the helical thread 56 bites into the wall of an opening the same as the crest of the circular circumferential grooves on the sleeve embodiments of FIGS. 1 and 4. In order to make spin-out of the insert more difficult, the axial striations 60 are provided into which the wall material flows. Before the insert 55 can be turned, it is necessary to strip out the wall material contained between the striations 60, of which there can be one or more. Once that is done, however, the insert can easily be unthreaded from the opening. This may occasionally be advantageous over the inserts of FIGS. 3 or 5 in which the circumferential grooves do not permit spin-out, but instead require to be axially stripped out of the hole if they are to be removed.

This insert may be conveniently installed by using a tool which is capable of exerting both a rotary motion on a mandrel, as well as a reciprocal motion thereon. Such a tool is shown in the Wing et al. Patent No. 2,789,619, issued April 23, 1957, entitled, Fluid Actuated Pulling and Rotating Tool. This tool provides a convenient means for unscrewing the mandrel after the insert has been set by a longitudinal pull, and any desired device can thereafter be threaded into the nut.

It may be desired to provide means for preventing the device threaded into the nut from being shaken loose. For this purpose, the last few threads in the nut could be upset longitudinally, or the nut could be slightly ovalled.

In order to create a diametral swell of about 0.006″–0.010″ on the sleeve using a conical angle of taper of taper of about 3° on the tapered section of the sleeve and the tapered surface on the nut, an axial movement of between 0.15″ and 0.20″ has been used. This conical angle is within the cone of friction and causes the nut to be retained in the sleeve on that account. Frequently a greater swell is desired, but a longer axial travel is not practicable. In that case, the taper angle may be increased. For example, an included conical angle of taper of about 6° may be used, which results in a diametral swell of about 0.012″–0.020″ for an axial nut movement of between 0.15″ and 0.20″. The 6° angle is greater than the cone of friction, but this has not created any particular locking problems, perhaps due to the locking action of the lip. While the locking which results from remaining within the cone of friction has been sacrificed, still an adequate lock seems to be attained.

The relationship between the volume of the crests or threads of the circumferential grooves or serrations 14 and of the helical thread 56 relative to the volume of the space between the crests is of considerable importance. For best results, it has been found desirable to provide the voids between the crests with a volume which is significantly greater than the volume of the crests themselves. For example, best results have been attained when the cross-sectional areas of these voids measured from tip to tip or adjacent crests end down to the root of the void is of the order of about 20% greater than the cross-sectional area of the crest portion of the striation measured from the root to the tip of the crest. The volume ratio will be a bit greater in this situation, because the centroid of the void will ordinarily be farther from the axis than the centroid to the crest.

This volumetric (or area) relationship appears desirable because of the nature of the flow of the wall material when the sleeve is expanded. At this time, when the crests of the serrations or threads bite into the wall, the material of the wall must flow into the voids between the crests. These voids must have a greater volume than the volume of the displaced material because, as is schematically illustrated in FIGS. 3 and 5, the material tends to flow in a wave down each face of the crests, leaving a void between two adjacent waves. The forces needed to compress this material into a void of equal or only slightly greater volume than the adjacent crests are often beyond those attainable with ordinary tools. For this reason it has been found desirable to provide grooves or threads which have fairly wide bottoms between relatively narrow crests. The result of this arrangement is shown in FIGS. 3 and 5, where a slight pocket is formed at the bottom of each void in the threads, but in which the crests of the serrations or threads have moved all the way into the wall.

By this invention there is provided an insert usable in relatively soft materials, for example, which is firmly retained in the material, becoming a permanent installation, and which furnishes a convenient threaded receptacle for devices which are to be attached to the object in which the insert is installed.

This invention is not to be limited to the embodiments shown in the drawings and described in the description, which are given by way of illustration and not of limitation, but only in accordance with the scope of the appended claims.

I claim:

1. An insert adapted to be installed in a hole in an object comprising: an unbroken-walled sleeve having a central axis and an axial bore therethrough, a head at one end of the sleeve, a lip at the other end of the sleeve, a helical thread in the exterior surface of the sleeve extending between the head and the lip, a groove extending across said thread parallel to the axis of the sleeve, a tapered section in said bore which increases in diameter toward the end of the sleeve having the lip, and a frusto-conical guide section on the end of the lip, said guide section having its smallest diameter at the tip of the lip; and an expander nut having a central axis, an axial threaded hole opening on a first end of the nut, an exterior frusto-conical tapered section enlarging in diameter as it extends away from the first end of the nut, a head at the second end of the nut, a locking groove in the exterior surface of the nut adjacent to the larger end of the tapered surface thereof, said locking groove having a pair of groove surfaces which taper inwardly away from said tapered surface, a first one of said groove surfaces constituting a substantially frusto-conical deflector surface facing toward the first end, and the second of said groove surfaces constituting a substantially frusto-conical locking surface facing toward the second end, the angle of taper on the tapered section of the nut and of the bore being substantially equal, and the axial lengths of the tapered sections also being substantially equal, whereby with the sleeve positioned within the hole in which it is to be installed, the nut may be drawn into the sleeve, the deflector surface and the guide surface then making contact to move the lip into the sleeve so that the engagement of the lip and locking surface will hold the nut in the sleeve, the insert being swollen by reaction between the tapered sections, the dimensions of the nut and sleeve being such that when the nut is pulled into the bore and locked by the lip, the tapered section of the nut stands axially aligned with at least a major fraction of the thread, the thread cutting into the body so as to leave a key of body material lying in said groove to lock the sleeve against unthreading from the body.

2. Apparatus according to claim 1 in which the thread has crests with voids between the crests, the volume of said crests being significantly less than the volume of said voids.

References Cited in the file of this patent

UNITED STATES PATENTS

| | | |
|---|---|---|
| 674,715 | Summerer | May 21, 1901 |
| 1,057,975 | Newhall et al. | Apr. 1, 1913 |
| 1,168,770 | Wagner | Jan. 18, 1916 |
| 1,396,611 | White | Nov. 8, 1921 |
| 1,850,768 | Peirce | Mar. 22, 1932 |
| 2,030,170 | Huck | Feb. 11, 1936 |
| 2,144,117 | Miller | Jan. 17, 1939 |
| 2,435,876 | De Swart | Feb. 10, 1948 |

FOREIGN PATENTS

| | | |
|---|---|---|
| 1,126,416 | France | July 30, 1956 |